(12) United States Patent
Li (10) Patent No.: US 7,550,875 B2
(45) Date of Patent: Jun. 23, 2009

(54) POWER CONVERTER AND RELATED METHOD CAPABLE OF PROVIDING MULTIPLE OUTPUT VOLTAGES

(75) Inventor: Yi-Mei Li, Nantou County (TW)

(73) Assignee: ADDtek Corp., Taipei (TW)

( * ) Notice: Subject to any disclaimer, the term of this patent is extended or adjusted under 35 U.S.C. 154(b) by 207 days.

(21) Appl. No.: 11/782,640

(22) Filed: Jul. 25, 2007

(65) Prior Publication Data
US 2008/0030076 A1 Feb. 7, 2008

Related U.S. Application Data

(60) Provisional application No. 60/821,577, filed on Aug. 7, 2006.

(51) Int. Cl.
*H02J 3/30* (2006.01)
*G05F 1/613* (2006.01)
*G05F 3/16* (2006.01)
*G05F 1/577* (2006.01)

(52) U.S. Cl. .................. 307/82; 323/223; 323/225; 323/267

(58) Field of Classification Search ............... 323/223, 323/225, 267; 307/82
See application file for complete search history.

(56) References Cited

U.S. PATENT DOCUMENTS 7,256,568 B2 * 8/2007 Lam et al. .................. 323/222
7,432,614 B2 * 10/2008 Ma et al. ..................... 307/31

* cited by examiner

*Primary Examiner*—Albert W Paladini
*Assistant Examiner*—Michael Rutland Wallis
(74) *Attorney, Agent, or Firm*—Winston Hsu (57) ABSTRACT

A power converter includes an inductor, first through fourth switches, and a control device. The first switch is coupled between a first end of the inductor and ground, the second switch is coupled between an input end and a second end of the inductor, the third switch is coupled between the first end of the inductor and a first output end, and the fourth switch is coupled between the second end of the inductor and a second output end. The control device charges the inductor by turning on the first and second switches. Based on output voltages of the first and second output ends, the control device determines whether the first and second output ends are to be charged or discharged. The second and third switches are turned on for charging the first output end, or the first and fourth switches are turned on for discharging the second output end.

19 Claims, 7 Drawing Sheets

POWER CONVERTER AND RELATED METHOD CAPABLE OF PROVIDING MULTIPLE OUTPUT VOLTAGES

CROSS REFERENCE TO RELATED APPLICATIONS

This application claims the benefit of U.S. Provisional Application No. 60/821,577, filed on Aug. 7, 2006 and entitled "Multiple Voltage Output Power Converter," the contents of which are incorporated herein by reference.

BACKGROUND OF THE INVENTION

1. Field of the Invention

The present invention relates to a power converter and related method, and more particularly, to a power converter and related method capable of providing multiple output voltages.

2. Description of the Prior Art

In general, an electronic device is composed of a variety of units. Each unit may be operated under a unique voltage level. Therefore, the electronic device must include a power converter for stably generating expected voltage levels. According to different requirements, there are different types of power converters, and many of the converters are derived from step down (Buck) converters and step up (Boost) converters. A step down converter reduces direct-current (DC) voltage of an input end to a predefined voltage level, while a step up power converters raises DC voltage of an input end to a predefined voltage level.

SUMMARY OF THE INVENTION

It is therefore a primary objective of the claimed invention to provide a power converter and related method capable of providing multiple output voltages.

The present invention discloses a power converter capable of providing multiple output voltages. The power converter comprises an input end for receiving an input voltage, a plurality of output ends for providing a plurality of output voltages, an inductor, a first switch coupled between a first end of the inductor and a predefined voltage with a voltage level lower than a voltage level of the input voltage, a second switch coupled between the input end and a second end of the inductor, a third switch coupled between the first end of the inductor and a first output end of a plurality of output ends, a fourth switch coupled between the second end of the inductor and a second output end of the plurality of output ends, and a control device for turning on the first switch and the second switch to charge the inductor, determining whether the first output end and the second output end are needed to be charged according to a first output voltage received from the first output end and a second output voltage received from the second output end, and turning on the second switch and the third switch to discharge the inductor through the first end of the inductor and charge the first output end, or turning on the first switch and the fourth switch to discharge the inductor through the first end of the inductor and discharge the second output end through the second end of the inductor, according to the determination result.

The present invention further discloses a method for providing multiple output voltages. The method comprises providing a first power source and a second power source with a level lower than a level of the first power source, providing a first path between a first end of an inductor and the first power source and providing a second path between a second end of the inductor and the second power source, so as to make current flow from the first power source through the first path, the inductor, and the second path to the second power source sequentially, for charging the inductor, determining whether a first output end is needed to be charged according to a first output voltage received from the first output end, providing the first path between the first end of the inductor and the first power source and providing a third path between the second end of the inductor and the first output end when the first output end is needed to be charged, so as to make current flow from the inductor through the third path to the first output end, for charging the first output end, determining whether a second output end is needed to be discharged according to a second output voltage received from the second output end, and providing a fourth path between the first end of the inductor and the second output end and providing the second path between the second end of the inductor and the second power source when the second output end is needed to be discharged, so as to make current flow from the second output end through the fourth path to the inductor, for discharging the second output end.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
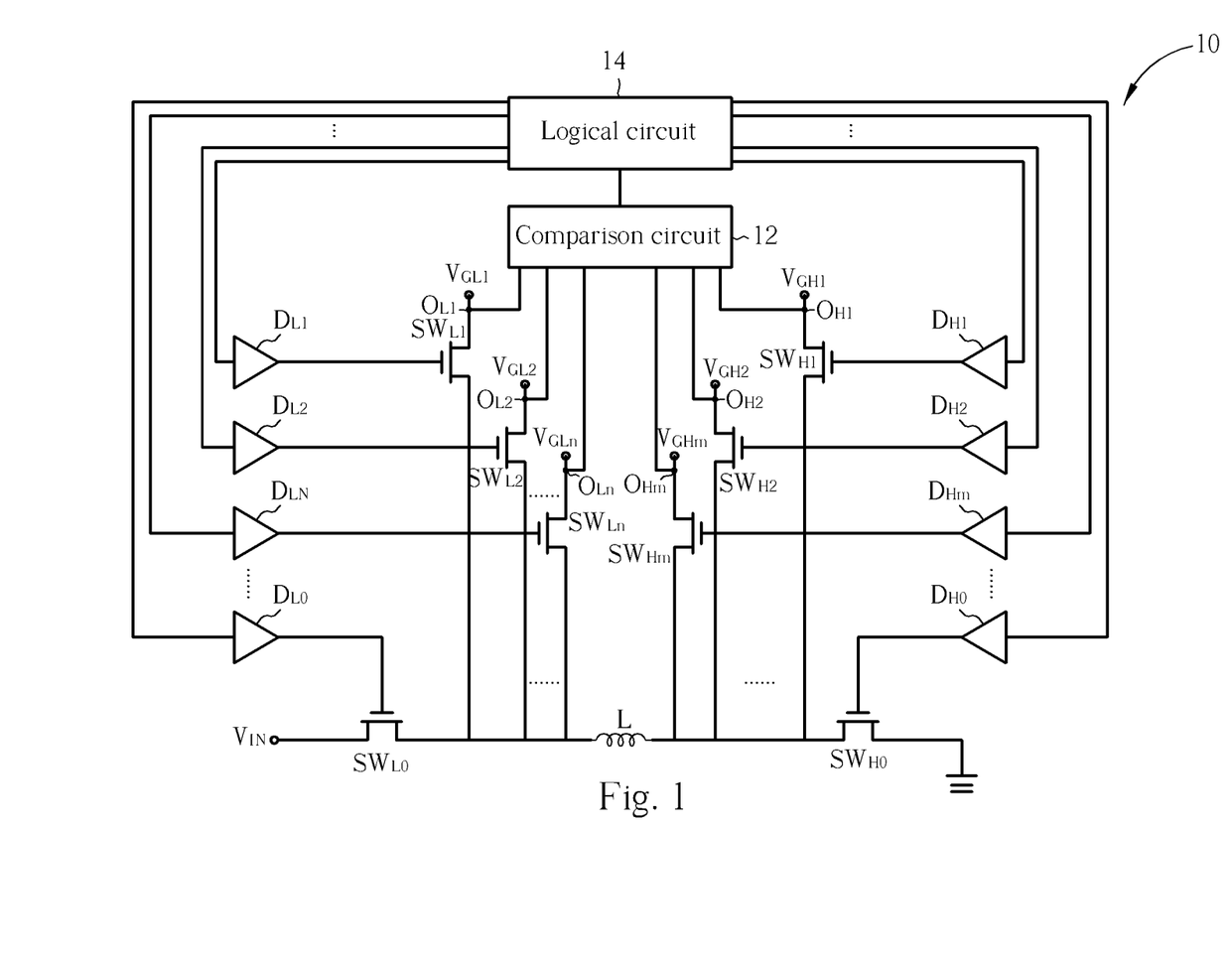
FIG. 1 illustrates a schematic diagram of a power converter capable of providing multiple output voltages according to a first embodiment of the present invention.

Please refer to FIG. 1. FIG. 1 illustrates a schematic diagram of a power converter 10 capable of providing multiple voltages according to a first embodiment of the present invention. The power converter 10 comprises a comparison circuit 12, a logic circuit 14, an inductor L, a plurality of switches $SW_{H0}$~$SW_{Hm}$ and $SW_{L0}$~$SW_{Ln}$, and a plurality of driving units $D_{H0}$~$D_{Hm}$ and $D_{L0}$~$D_{Ln}$. The power converter 10 comprises an input end, m number of output ends $O_{H1}$~$O_{Hm}$ and n number of output ends $O_{L1}$~$O_{Ln}$. A voltage level of the input end is represented by $V_{IN}$, and voltage levels of the output ends $O_{H1}$~$O_{Hm}$ and $O_{L1}$~$O_{Ln}$ are respectively represented by $V_{GH1}$~$V_{GHm}$ and $V_{GL1}$~$V_{GLn}$. The inductor L comprises a first end and a second end respectively coupled to a ground and the input end of the power converter 10 through the switches $SW_{H0}$ and $SW_{L0}$. Each of the switches $SW_{H1}$~$SW_{Hm}$ is coupled between one of the output ends $O_{H1}$~$O_{Hm}$ and the first end of the inductor, and each of the switches $SW_{L1}$~$SW_{Ln}$ is coupled between one of the output ends $O_{L1}$~$O_{Ln}$ and the second end of the inductor. The comparison circuit 12 is coupled to the input end of the power converter 10, and compares values of the output voltages $V_{GH1} \sim V_{GHm}$ and $V_{GL1} \sim V_{GLn}$ with predefined voltages. Then, the logical circuit 14 controls the driving units $D_{H0} \sim D_{Hm}$ and $D_{L0} \sim D_{Ln}$ according to the comparison results provided by the comparison circuit 12. The driving units $D_{H0} \sim D_{Hm}$ provide control signals for turning on (forming short circuit) or turning off (forming open circuit) the switches $SW_{H0} \sim SW_{Hm}$, while the driving units $D_{L0} \sim D_{Ln}$ provide control signals for turning on or turning off the switches $SW_{L0} \sim SW_{Ln}$.

Figure 2:
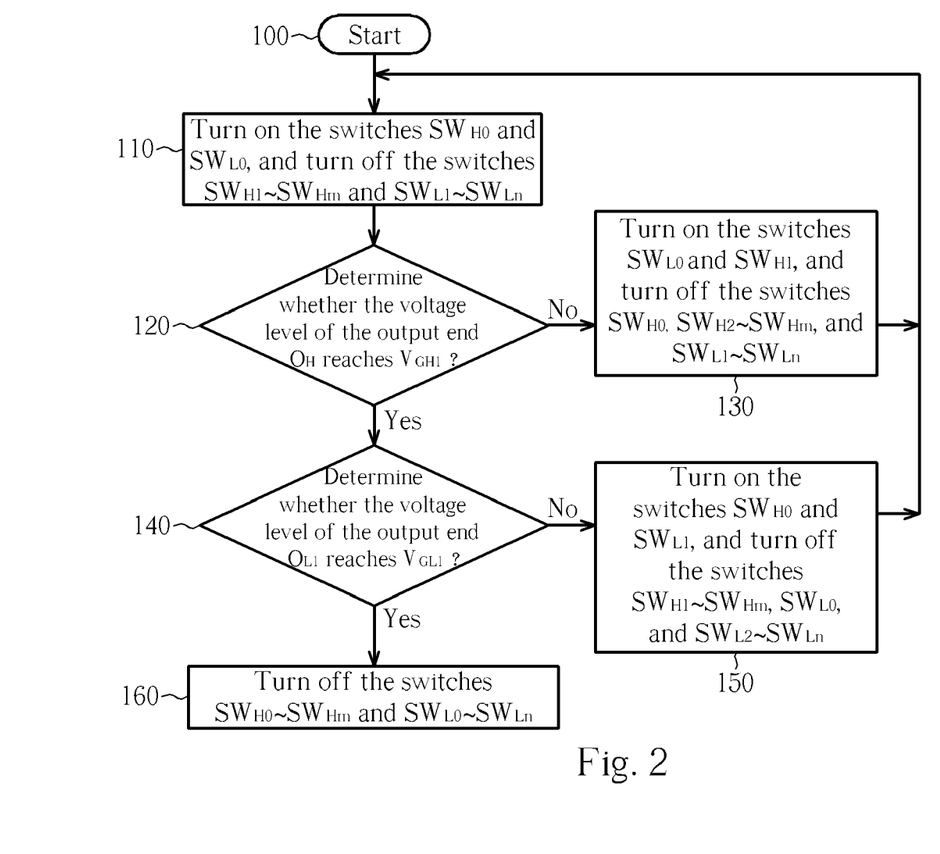
FIG. 2 illustrates a flow chart of operations of the power converter shown in FIG. 1.

In the power converter 10 of the first embodiment of the present invention, the input voltage $V_{IN}$ can be upgraded to the output voltages $V_{GH1} \sim V_{GHm}$ or reduced to the output voltages $V_{GL1} \sim V_{GLn}$. That is, according to different requirements, the power converter 10 transforms the input voltage $V_{IN}$ into the output voltages with the (m+n) number of voltage levels. For example, if the output voltages $V_{GL1}$ and $V_{GH1}$ are to be provided, a flow chart of operations of the power converter 10 is illustrated in FIG. 2, and comprises following steps:

Step 100: Start.

Step 110: Turn on the switches $SW_{H0}$ and $SW_{L0}$, and turn off the switches $SW_{H1} \sim SW_{Hm}$ and $SW_{L1}$ $SW_{Ln}$.

Step 120: Determine whether the voltage level of the output end $O_H$ reaches $V_{GH1}$; if true, execute step 140; if false, execute step 130.

Step 130: Turn on the switches $SW_{L0}$ and $SW_{H1}$, and turn off the switches $SW_{H0}$, $SW_{H2} \sim SW_{Hm}$, and $S_{WL1} \sim SW_{Ln}$, and execute step 110.

Step 140: Determine whether the voltage level of the output end $O_{L1}$ reaches $V_{GL1}$; if true, execute step 160; if false, execute step 150.

Step 150: Turn on the switches $SW_{H0}$ and $SW_{L1}$, and turn off the switches $SW_{H1} \sim SW_{Hm}$, $SW_{L0}$, and $SW_{L2} \sim SW_{Ln}$, and execute step 110.

Step 160: Turn off the switches $SW_{H0} \sim SW_{Hm}$ and $SW_{L0} \sim SW_{Ln}$.

Figure 3:
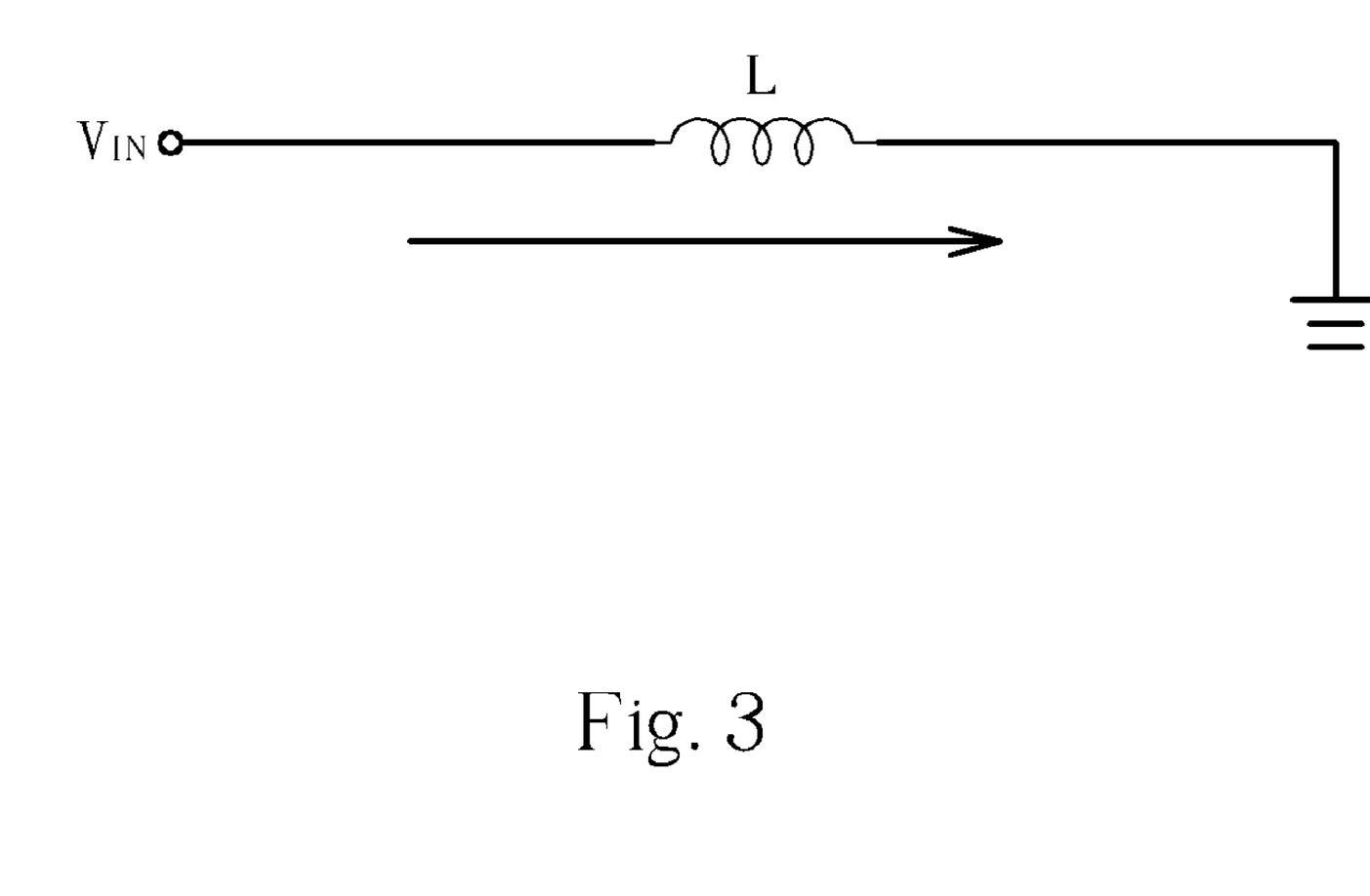
FIG. 3 illustrates an equivalent circuit diagram of a power converter.
Figure 4:
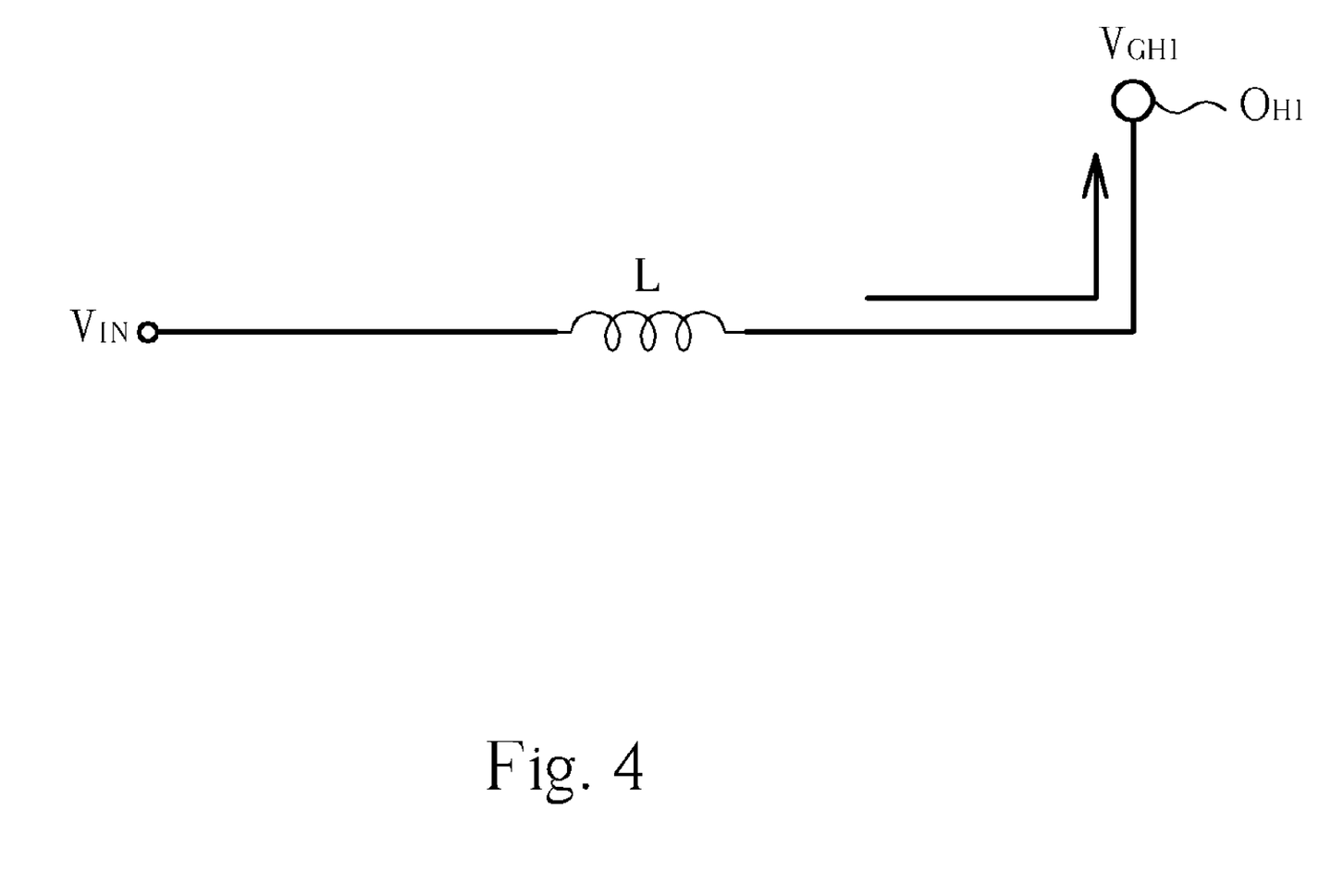
FIG. 4 illustrates an equivalent circuit diagram of a power converter.
Figure 5:
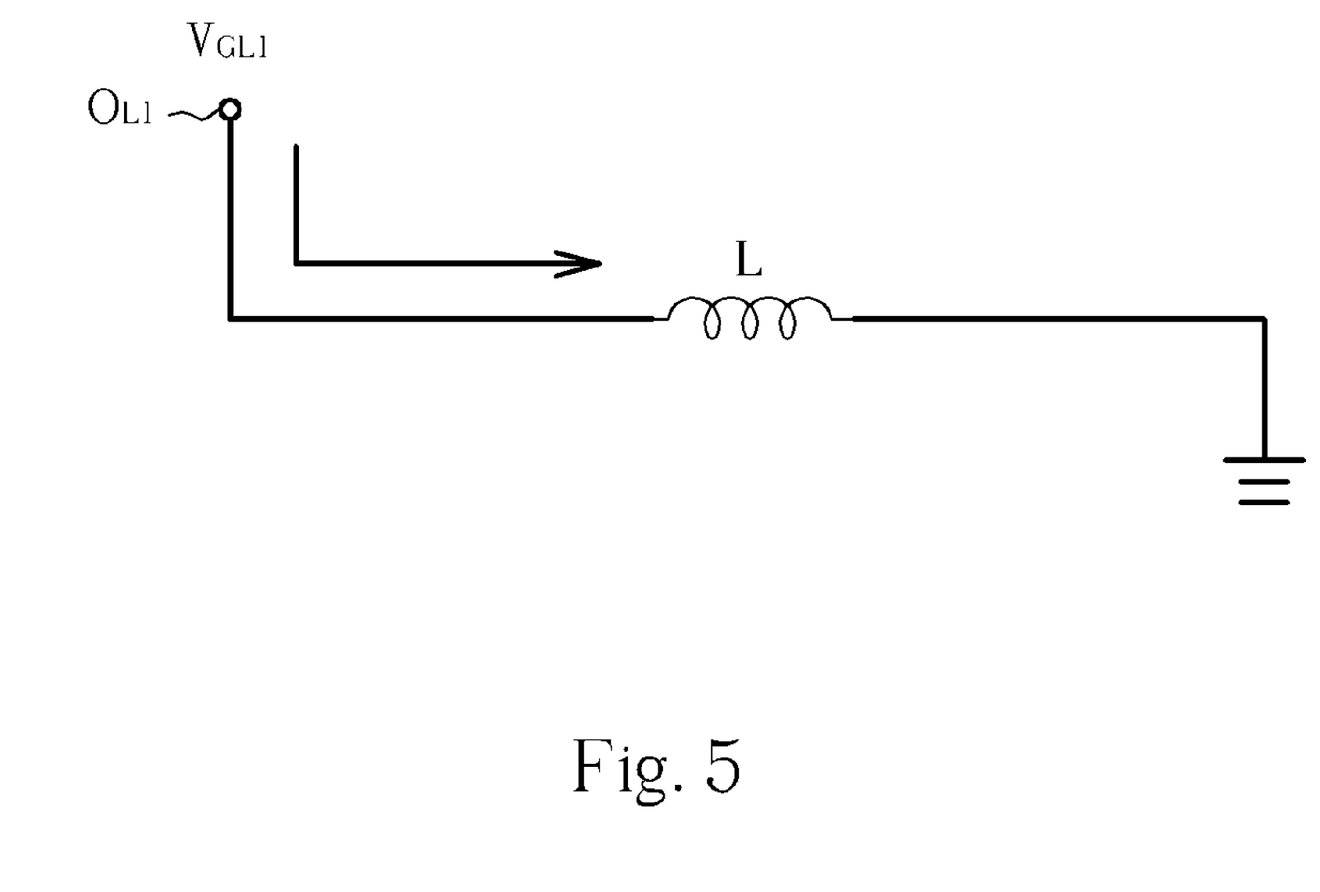
FIG. 5 illustrates an equivalent circuit diagram of a power converter.

In the flow chart shown in FIG. 2, when turning on the switches $SW_{H0}$ and $SW_{L0}$ and turning off other switches in the step 110, the power converter 10 charges the inductor L. When the voltage level of the output end $O_{H1}$ in the step 110 does not reach $V_{GH1}$, the step 130 is executed for turning on the switches $SW_{L0}$ and $SW_{H1}$ and turning off other switches, so that the power converter 10 discharges the inductor L and charges the output end $O_{H1}$ until the voltage level of the output end $O_{H1}$ reaches $V_{GH1}$. Similarly, in the step 140, when the voltage level of the output end $O_{L1}$ does not reach $V_{GL1}$, the step 150 is executed for turning on the switches $SW_{H0}$ and $SW_{L1}$ and turning off other switches, so that the power converter 10 discharges the inductor L and charges the output end $O_{L1}$ until the voltage level of the output end $O_{L1}$ reaches $V_{GL1}$. Please refer to FIG. 3 to FIG. 5. FIG. 3 illustrates an equivalent circuit diagram of the power converter 10 after executing the step 110, FIG. 4 illustrates an equivalent circuit diagram of the power converter 10 after executing the step 130, and FIG. 5 illustrates an equivalent circuit diagram of the power converter 10 after executing the step 150. From FIG. 3 to FIG. 5, arrows represent current directions.

Figure 6:
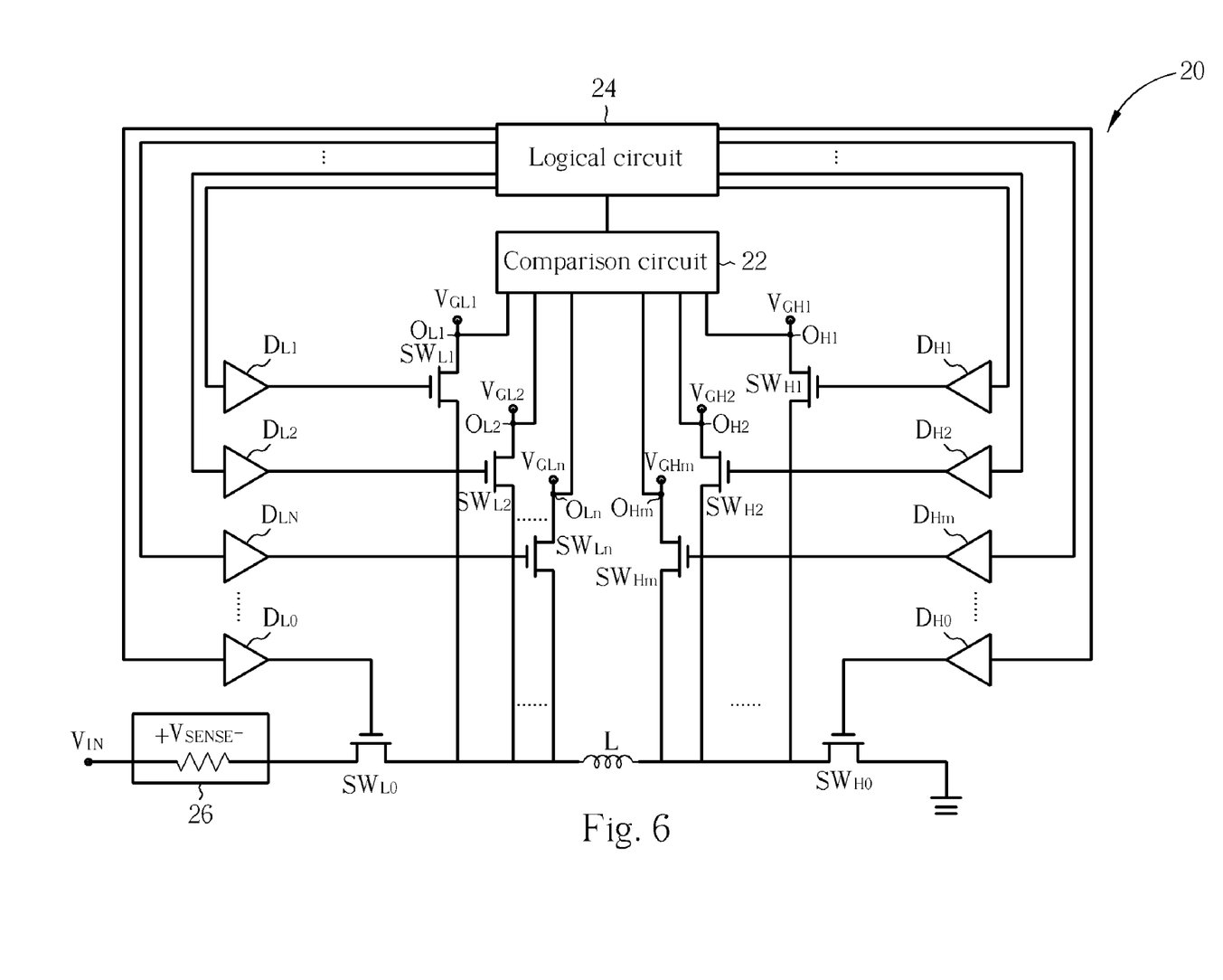
FIG. 6 illustrates a schematic diagram of a power converter capable of providing multiple output voltages according to a second embodiment of the present invention.

Please refer to FIG. 6. FIG. 6 illustrates a schematic diagram of a power converter 20 capable of providing multiple output voltages according to a second embodiment of the present invention. The power converter 20 comprises a comparison circuit 22, a logical circuit 24, a current limitation unit 26, an inductor L, a plurality of switches $SW_{H0} \sim SW_{Hm}$ and $SW_{L0} \sim SW_{Ln}$, and a plurality of driving units $D_{H0} \sim D_{Hm}$ and $D_{L0} \sim D_{Ln}$. The power converter 20 comprises an input end, m number of output ends $O_{H1} \sim O_{Hm}$, and n number of output ends $O_{L1} \sim O_{Ln}$. A voltage level of the input end is represented by $V_{IN}$, and voltage levels of the output ends $O_{H1} \sim O_{Hm}$ and $O_{L1} \sim O_{Ln}$ are respectively represented by $V_{GH1} \sim V_{GHm}$ and $V_{GL1} \sim V_{GLn}$. A first end of the inductor L is coupled to a ground voltage through the switch $SW_{H0}$, and a second end of the inductor L is coupled to the input end of the power converter 20 through the switch $SW_{L0}$ and the current limitation unit 26. Each of the switches $SW_{H1} \sim SW_{Hm}$ is coupled between one of the output ends $O_{H1} \sim O_{Hm}$ and the first end of the inductor L, and each of the switches $SW_{L1} \sim SW_{Ln}$ is coupled between one of the output ends $O_{L1} \sim O_{Ln}$ and the second end of the inductor L. In the power converter 20, the current limitation unit 26 comprises a resistance R. A cross voltage of the resistance R is represented by $V_{SENSE}$. The comparison circuit 22 is coupled to the input end of the power converter 20, and compares the values of the output voltages $V_{GH1} \sim V_{GHm}$ and $V_{GL1} \sim V_{GLn}$ with predefined voltage levels. Then, the logical circuit 24 controls the driving units $D_{H0} \sim D_{Hm}$ and $D_{L0} \sim D_{Ln}$ according to the comparison results provided by the comparison circuit 22 and the cross voltage $V_{SENSE}$. The driving units $D_{H0} \sim D_{Hm}$ provide control signals for switching the switches $SW_{H0} \sim SW_{Hm}$, and the driving units $D_{H0} \sim D_{Hm}$ provide control signals for switching the switches $SW_{L0} \sim SW_{Ln}$.

Figure 7:
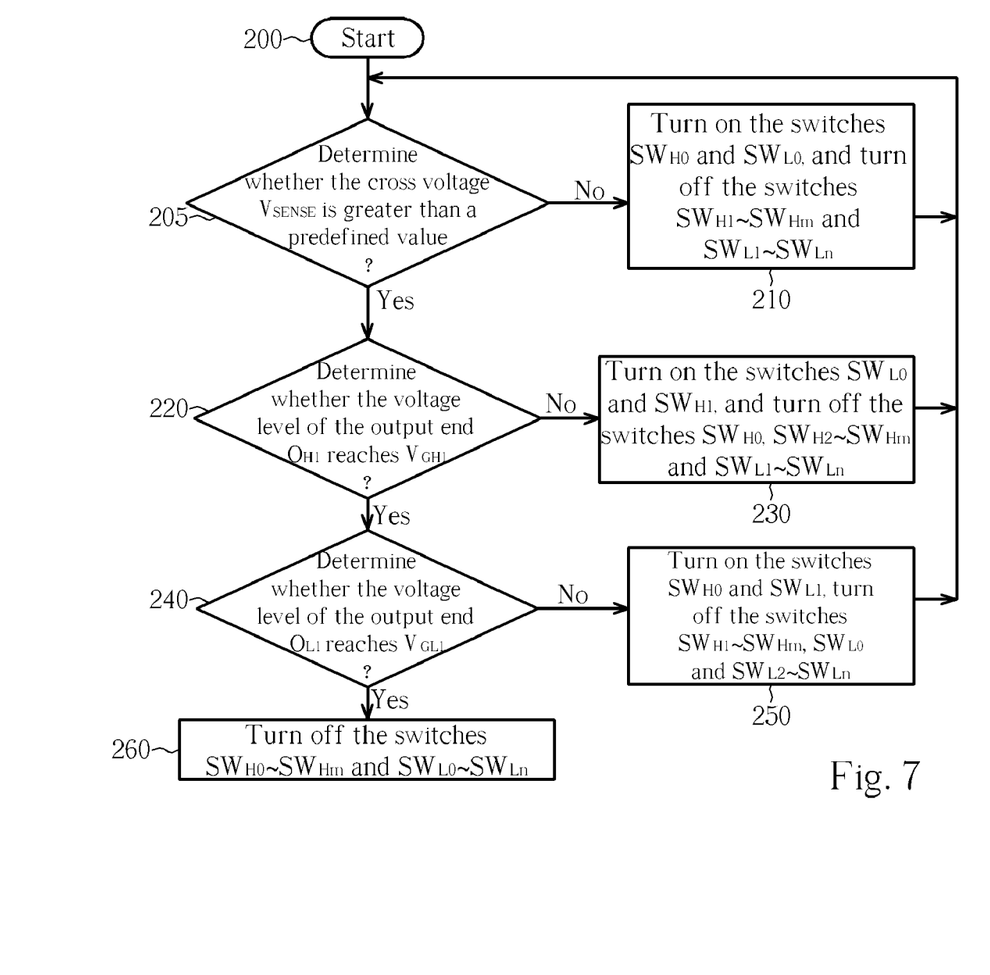
FIG. 7 illustrates a flow chart of operations of the power converter shown in FIG. 6.

Comparing to the power converter 10 of the first embodiment of the present invention, the power converter 20 of the second embodiment of the present invention is also capable of transforming the input voltage $V_{IN}$ into the output voltages with (m+n) voltage levels. The difference between them is that the power converter 20 comprises the current limitation device 26. The power converter 20 controls current flowing through the inductor L according to the cross voltage $V_{SENSE}$ of the current limitation unit 26. For example, if the output voltages $V_{GL1}$ and $V_{GH1}$ are to be provided, a flow chart of operation of the power converter 20 is illustrated in FIG. 7, and comprises following steps:

Step 200: Start.

Step 205: Determine whether the cross voltage $V_{SENSE}$ is greater than a predefined value; if true, execute step 220; if false, execute step 210.

Step 210: Turn on the switches $SW_{H0}$ and $SW_{L0}$, and turn off the switches $SW_{H1} \sim SW_{Hm}$ and $SW_{L1} \sim SW_{Ln}$, and execute step 205.

Step 220: Determine whether the voltage level of the output end $O_{H1}$ reaches $V_{GH1}$; if true, execute step 240; if false, execute step 230.

Step 230: Turn on the switches $SW_{L0}$ and $SW_{H1}$, and turn off the switches $SW_{H0}$, $SW_{H2} \sim SW_{Hm}$ and $SW_{L1} \sim SW_{Ln}$, and execute step 205.

Step 240: Determine whether the voltage level of the output end $O_{L1}$, reaches $V_{GL1}$, if true, execute step 260; if false, execute step 250.

Step 250: Turn on the switches $SW_{H0}$ and $SW_{L1}$, turn off the switches $SW_{H1} \sim SW_{Hm}$, $SW_{L0}$ and $SW_{L2} \sim SW_{Ln}$, and execute step 205.

Step 260: Turn off the switches $SW_{H0} \sim SW_{Hm}$ and $SW_{L0} \sim SW_{Ln}$.

In the flow chart of FIG. 7, the step 205 first determines whether the cross voltage $V_{SENSE}$ of the current limitation device 26 is greater than the predefined value. If the cross voltage $V_{SENSE}$ is not greater than the predefined value, the step 210 is executed for turning on the switches $SW_{H0}$ and $SW_{L0}$ and turning off other switches, so that the power converter 20 charges the inductor L. If the cross voltage $V_{SENSE}$ is greater than the predefined value, the step 220 is executed for determining whether the voltage level of the output end $O_{H1}$ reaches $V_{GH1}$, and the step 240 is executed for determining whether the voltage level of the output end $O_{L1}$ reaches $V_{GL1}$. In the step 220, if the voltage level of the output end $O_{H1}$ does not reach $V_{GH1}$, the step 230 is executed for turning on the switches $SW_{L0}$ and $SW_{H1}$ and turning off other switches, so that the power converter 20 discharges the inductor L and charges the output end $O_{H1}$ until the voltage level of the output end $O_{H1}$ reaches $V_{GH1}$. Similarly, in the step 240, when the voltage level of the output end $O_{L1}$ does not reach $V_{GL1}$, the step 250 is executed for turning on the switches $SW_{H0}$ and $SW_{L1}$ and turning off other switches, so that the power converter 20 discharges the inductor L and charges the output end $O_{L1}$ until the voltage level of the output end $O_{L1}$ reaches $V_{GL1}$. Please refer to FIG. 3 to FIG. 5 again. FIG. 3 similarly illustrates an equivalent circuit diagram of the power converter 20 after executing the step 210, FIG. 4 similarly illustrates an equivalent circuit diagram of the power converter 20 after executing the step 230, and FIG. 5 similarly illustrates an equivalent circuit diagram of the power converter 20 after executing the step 250.

In summary, according to different requirements, the power converter of the present invention is capable of transforming an input voltage into a plurality of output voltages with different voltage levels and determining to charge and discharge according to output voltage levels of the output ends, so as to effectively reduce or boost input voltages.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power converter capable of providing multiple output voltages comprising:
   an input end for receiving an input voltage;
   a plurality of output ends for providing a plurality of output voltages; an inductor;
   a first switch coupled between a first end of the inductor and a predefined voltage with a voltage level lower than a voltage level of the input voltage;
   a second switch coupled between the input end and a second end of the inductor;
   a third switch coupled between the first end of the inductor and a first output end of the plurality of output ends;
   a fourth switch coupled between the second end of the inductor and a second output end of the plurality of output ends; and
   a control device for turning on the first switch and the second switch to charge the inductor, determining whether the first output end and the second output end are needed to be charged according to a first output voltage received from the first output end and a second output voltage received from the second output end, and turning on the second switch and the third switch to discharge the inductor through the first end of the inductor and charge the first output end, or turning on the first switch and the fourth switch to discharge the inductor through the first end of the inductor and discharge the second output end through the second end of the inductor, according to the determination result.

2. The power converter of claim 1, wherein the control device comprises:
   a first driving device, for generating a first driving signal according to a first logical signal, for turning on or off the third switch;
   a second driving device, for generating a second driving signal according to a second logical signal, for turning on or off the fourth switch;
   a comparison circuit, for comparing the first output voltage with a first predefined voltage and comparing the second output voltage with a second predefined voltage, and generating a corresponding reference signal according to the comparing result; and
   a logical circuit, for generating the first and second logical signal according to the reference signal.

3. The power converter of claim 1 further comprising:
   a current limitation device coupled between the input end and the second switch, for controlling current flowing through the inductor.

4. The power converter of claim 1, wherein the current limitation device comprises a resistor.

5. The power converter of claim 1 further comprising:
   a plurality of third switches coupled between the first end of the inductor and a corresponding output end of the plurality of output ends; and
   a plurality of fourth switches coupled between the second end of the inductor and a corresponding output end of the plurality of output ends.

6. The power converter of claim 1, wherein the predefined voltage is a ground voltage.

7. The power converter of claim 1, wherein the first output voltage is higher than the input voltage and the second output voltage is lower than the input voltage.

8. A method for providing multiple output voltages comprising the following steps:
   (a) providing a first power source and a second power source with a level lower than a level of the first power source;
   (b) providing a first path between a first end of an inductor and the first power source and providing a second path between a second end of the inductor and the second power source, so as to make current flow from the first power source through the first path, the inductor, and the second path to the second power source sequentially, for charging the inductor;
   (c) determining whether a first output end is needed to be charged according to a first output voltage received from the first output end;
   (d) providing the first path between the first end of the inductor and the first power source and providing a third path between the second end of the inductor and the first output end when the first output end is needed to be charged, so as to make current flow from the inductor through the third path to the first output end, for charging the first output end;
   (e) determining whether a second output end is needed to be discharged according to a second output voltage received from the second output end; and
   (f) providing a fourth path between the first end of the inductor and the second output end and providing the second path between the second end of the inductor and the second power source when the second output end is needed to be discharged, so as to make current flow from the second output end through the fourth path to the inductor, for discharging the second output end.

9. The method of claim 8, wherein providing the first path is providing a turned-on first switch, providing the second path is providing a turned-on switch, providing the third path is providing a turned-on third switch, and providing the fourth path is providing a turned-on fourth switch.

10. The method of claim 9, wherein step (b) further comprises turning on the first switch and the second switch and turning off the third switch and the fourth switch, step (d) further comprises turning on the first switch and the third switch and turning off the second switch and the fourth switch, and step (f) further comprises turning on the second switch and the fourth switch and turning off the first switch and the third switch.

11. The method of claim 8, wherein step (c) determines whether the first output end is needed to be charged according to a relation between the first output voltage and a first predefined voltage, and step (d) provides the first path and the third path when the first output voltage is smaller than the first predefined voltage.

12. The method of claim 11, wherein the first predefined voltage is higher than the level of the first power source.

13. The method of claim 8, wherein step (e) determines whether the second output end is needed to be discharged according to a relation between the second output voltage and a second predefined voltage, and step (f) provides the second path and the fourth path when the second output voltage is greater than the second predefined voltage.

14. The method of claim 13, wherein the second predefined voltage is lower than the level the first power source.

15. The method of claim 8, wherein the second power source is providing a ground voltage.

16. The method of claim 8 further comprising:
determining whether a third output end is needed to be charged according to a third output voltage received from the third output end; and
providing the first path between the first end of the inductor and the first power source and providing a fifth path between the second end of the inductor and the third output end when the third output end is needed to be charged, so as to make current flow from the inductor through the fifth path to the third output end, for charging the third output end.

17. The method of claim 16, wherein providing the fifth path is providing a turned-on fifth switch.

18. The method of claim 8 further comprising:
determining whether a fourth output end is needed to be discharged according to the fourth output voltage received from the fourth output end; and
providing a sixth path between the first end of the inductor and the fourth output end and providing the second path between the second end of the inductor and the second power source when the forth output end needs to be discharged, so as to make current flow from the fourth output end through the sixth path to the inductor, for discharging the fourth output end.

19. The method of claim 18, wherein providing the sixth path is providing a turned-on sixth switch.

* * * * *